United States Patent [19]
Shimizu et al.

[11] Patent Number: 5,464,370
[45] Date of Patent: Nov. 7, 1995

[54] DEVICE FOR CHANGING A FLUID PASSAGE

[75] Inventors: Keishi Shimizu; Kanzi Shimizu, both of Hyogo; Masanobu Mitsumachi, Saitama; Masato Nakajima, Tokyo; Tetsushi Ishigami, Kanagawa; Yoshitake Kusamichi, Hyogo, all of Japan

[73] Assignees: Yugen Kaisha New Media Systems, Hyogo; Daito Teck Kabushiki Kaisha, Osaki; Yoshitake Kusamichi, Hyogo, all of Japan

[21] Appl. No.: 123,963

[22] Filed: Sep. 21, 1993

[30] Foreign Application Priority Data

Sep. 21, 1992 [JP] Japan ................................. 4-278138

[51] Int. Cl.$^6$ .................................................. F16K 11/04
[52] U.S. Cl. ........................................... 454/345; 454/341
[58] Field of Search .................................... 454/341, 343, 454/345; 137/625.44

[56] References Cited

U.S. PATENT DOCUMENTS 1,858,024  5/1932  Moore ........................ 454/234
2,750,868  6/1956  Mieczkowski et al. ................ 454/343
3,188,937  6/1965  Mieczkowski ......................... 454/343

FOREIGN PATENT DOCUMENTS 403099147  4/1991  Japan ..................................... 454/345

OTHER PUBLICATIONS

"Example of Air Conditioning System with Care of Window Opening", IBC'91. 7, No. 65 vol. 12–2, pp. 13–20, Published Jul. 1, 1991.

Primary Examiner—John C. Fox
Attorney, Agent, or Firm—Lowe, Price, LeBlanc & Becker

[57] ABSTRACT

A device for changing air flow from a room has a casing with three openings arranged in a T-shaped disposition. The first and second openings are arranged in a L-shape with respect to a chamber in the casing, and the third opening connects the chamber to an exhaust passage. A flap is provided, with a side end rotatably supported at a corner between the first opening and the second opening such that the flap can be moved between positions for selectively closing the first or second opening by operation of a mechanism for rotating the flap.

5 Claims, 8 Drawing Sheets

DEVICE FOR CHANGING A FLUID PASSAGE

FIELD OF THE INVENTION

The present invention relates to a device for changing fluid passage, and particularly, to a device to be interposed in a pipe line of liquid or gas so as to automatically select a suitable passage in accordance with change of external conditions or the like.

BACKGROUND OF THE RELATED ART

Manually controlled or electro-magnetic changing valves have been hitherto used in order to change directions of flow in a fluid pressure circuit, an air pressure circuit and the like. Further, it has been known that the changing valves are automatically interchanged in accordance with external conditions, such as expansion-contraction of an air cylinder, increase of oil temperature, or the like, detected by sensors or transducers.

Such changing valves can quickly change fluid passages of a relatively high pressure circuit. On the other hand, those valves are not suitable for changing passage of low pressure and large volume flow, for example, a water duct or an air duct.

SUMMARY OF THE INVENTION

A principal object of the present invention is to provide a device for exactly and quickly changing the fluid passage, especially for low pressure and large volume flows, in which the flow resistance is small.

Another related object of the present invention is to provide an air control device capable of saving energy by using the above changing device.

SUMMARY OF THE INVENTION

The above mentioned first object is realized by a device for changing fluid passage of the present invention comprising (a) a casing having a first opening, a second opening arranged substantially in L-shaped form to the first opening with respect to a chamber in the casing, and a third opening connecting the chamber to an exhaust passage. The device further has (b) a flap having a side end rotatably supported at a corner between the first opening and the second opening in the casing, such that the flap can be selectively rotated to a first position for closing the first opening and a second position for closing the second opening, and (c) a means for rotating the flap.

Further, the first object can be realized by a device comprising (a) a casing having a first opening, a second opening and an exhaust opening arranged mutually in a T-shaped form, (b) a flap provided for rotation around an axis crossing a center of a chamber in the casing, such that the flap can be selectively rotated to a first position for closing the first opening and a second position for closing the second opening, and (c) a means for rotating the flap.

In the above devices, when the flap closes the second opening, the flap functions as a portion of an inside wall of the casing, and the first opening is connected with the third opening or exhaust opening as a straight line. Therefore, flow resistance is low.

When the rotating means is operated under the situation, the flap is rotated for about 90 degrees, and then, the first opening is closed, and the second opening is opened. Under the situation, the flow resistance is also low.

The above-mentioned second object is realized by an air control system of the present invention comprising (a) a first passage connected with inside of a room at a position near a ceiling, (b) a second passage connected with inside of the room at a position near a floor, (c) an exhaust passage connected with outside of the room, (d) a device for changing flow passage for selectively connecting one of the first and second passages to the exhaust passage, and (e) a controlling mechanism for controlling the changing device.

The above-mentioned controlling mechanism might be a mechanism for controlling the device for changing flow passage by remote control or a separated thermo-controller for automatically changing it at pre-determined temperature. The operating temperature might be preferably set at one's option.

Hereinafter some preferable embodiments are described with reference to the attached drawings.

DETAILED DESCRIPTION OF THE PREFERRED EMBODIMENT

Figure 1:
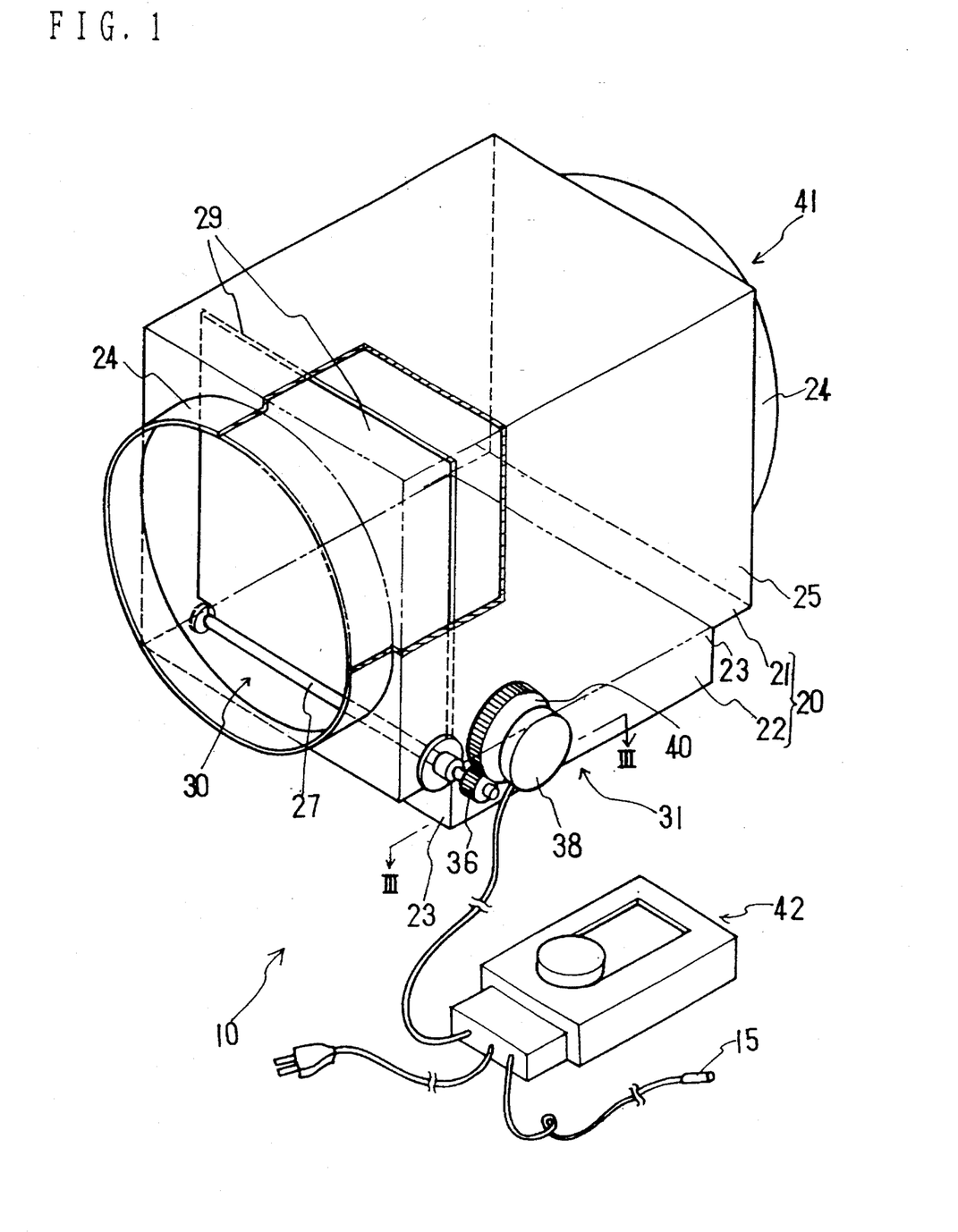
FIG. 1 is a partially cut-off perspective view showing an embodiment of a device of the present invention.

The flow changing device, generally denoted by 10, in FIG. 1 has a T-shaped casing 20, and the casing 20 has a main tubular portion 21 with a square cross-section and a sub-tubular portion 22 also having a square cross section. That is to say, the casing 20 can be understood as a parallel hexahedron with step-like cut portions 23 at front and rear lower portions. Both ends of the main tubular portions 21 and the lower end of the sub-tubular portion 22 are provided with openings 30, 41 and 31 and respective cylindrical flanges 24 to be connected with flow lines. The casing 20 can be made by processing a sheet metal such as a steel sheet. However, as occasion demands, synthetic resin plate, especially fiber reinforced plastic, can be employed as a material of the casing 20. The front opening 30 of the main tubular portion 21 is the first opening, and another opening 41 is the third opening to be an exhaust opening. The opening 31 of the sub-tubular portion 22 is the second opening. Further, the inside space of the main tubular portion 21 is a chamber.

Figure 3:
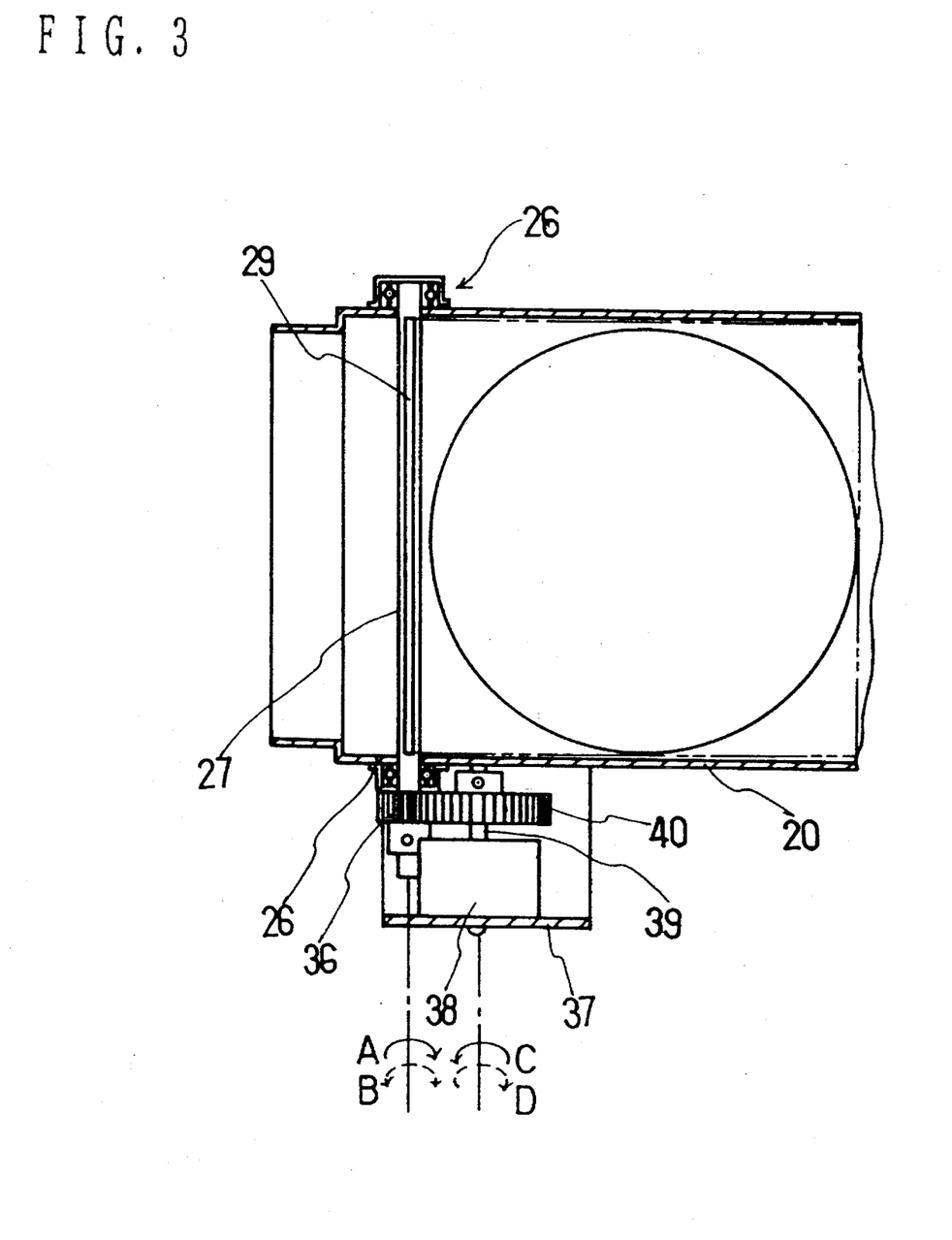
FIG. 3 is a sectional view taken along line III—III of FIG. 1.

As shown in FIG. 3, a pair of shaft receivers or bearings 26 are attached to the left and right side walls 25 of the main tubular portion 21, at a corner between the first opening 30 and the second opening 31. Rotary shaft 27 is rotatably supported on the pair of bearings 26. A flap 29 is fixed along an edge to the rotary shaft 27.

Figure 2:
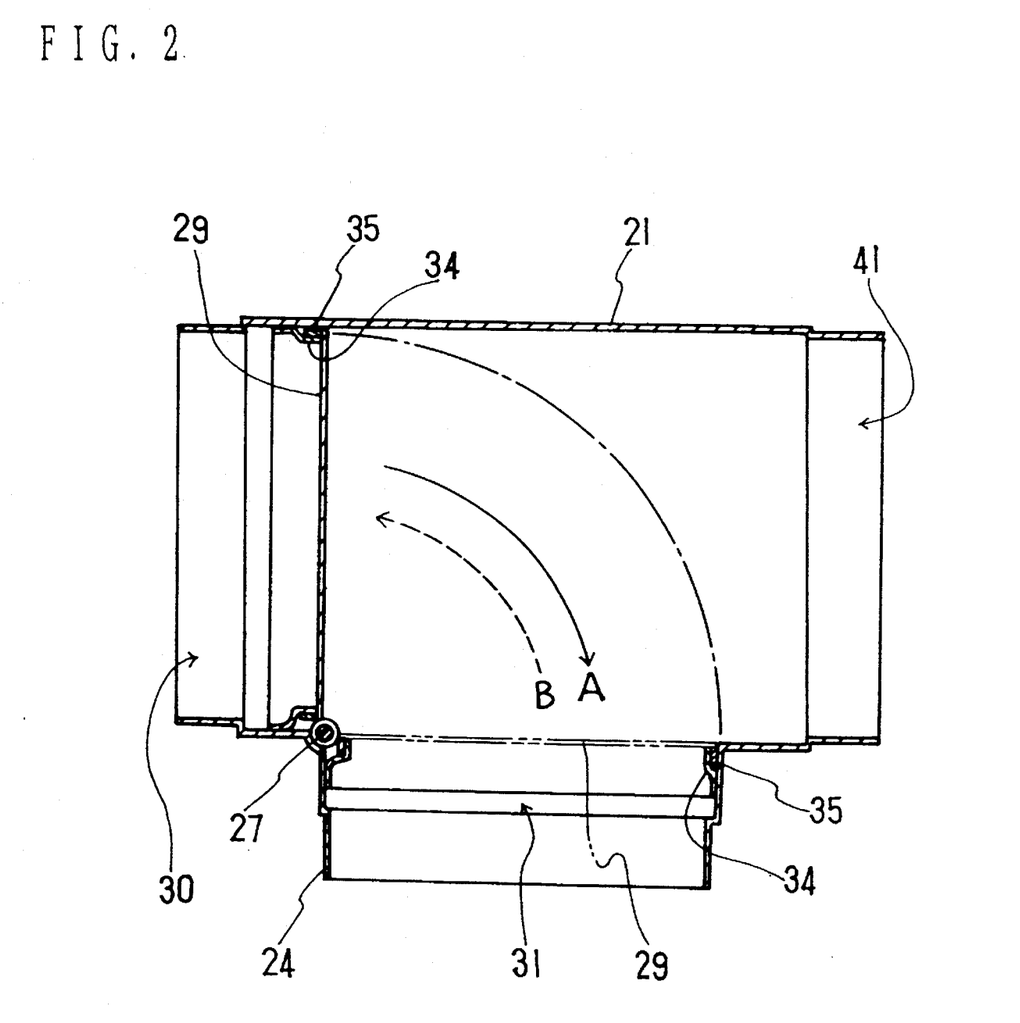
FIG. 2 is a longitudinal sectional view of the device shown in FIG. 1.

Referring to FIG. 2, at the circumferences of the first and second openings 30 and 31 which are inlets of the main tubular portion 21, rubber seats or seal members 35 are attached by means of ring-like or frame-like brackets 34, respectively, such that the flap 29 becomes in contact in order to shut the openings. Thus, each seal member 35 functions as a stopper for the flap 29. However, the rotatable area of the flap 29 might be directly limited by the rotating mechanism without using such stoppers.

Hereinafter, referring to FIG. 3, an embodiment of mechanism for rotating the rotary shaft 27 is explained.

An end of the rotary shaft 27 is extended through the side wall 25 of the main tubular portion 21, and a small diameter gear or pinion 36 is fixed to the projecting end of the rotary shaft 27. On the other side, an oil-driving rotary actuator 38 or an electric-magnetic rotary solenoid, capable of rotating for about 45 degrees is attached on a bracket 37 attached on the outer surface of the casing 20 through a braket 37. And a large diameter gear 40 is fixed to a drive shaft 39 of the rotary actuator 38, and is mated with the small gear 36.

If prevention against explosion is not required, an electric motor can be employed for the rotary actuator 38. Further, the flap 29 can be directly reciprocally driven with an air or oil cylinder, and can be rotated through a rack-and-pinion mechanism.

The rotary actuator is controlled by a controller 42 shown in FIG. 1. The controller 42 might have a fluid actuated relay or electro-magnetic relay, a circuit for detecting and amplifying a signal of a fluid sensor 15 or electric transducer, a sequential circuit for driving the fluid relay or the like in accordance with such signals, a switch for setting upper and lower conditions such as temperature at which the actuators start to operate, and the like. A fluid sensor which has its own non-sensitive band can be employed as the above fluid sensor 15. In this case, a simple setting switch is sufficient for stable operation of the device. If prevention of explosion is required, fluidics elements are preferably employed. However, if prevention against explosion is not required, an electric element can be employed in the controller 42.

The above changing device 10 operates as mentioned below. When the rotary actuator 38 rotates in directions of arrow C-D in FIG. 3 in accordance with signals from the controller 42, the rotary shaft 27 is rotated in directions of arrow A-B through the gears 40 and 36. Then, the flap 29 abuts against one of the seal members 35 to shut the first opening 30 or the second opening 31 and to open another opening. That is, when the flap 29 rotates in the direction arrow A, the first opening 30 and the third opening 41 are communicated, and the second opening 31 becomes closed. And when the flap 29 rotates in the direction of arrow B, the second opening 31 and the third opening 41 are mutually communicated, and the first opening 30 is closed.

Figure 4:
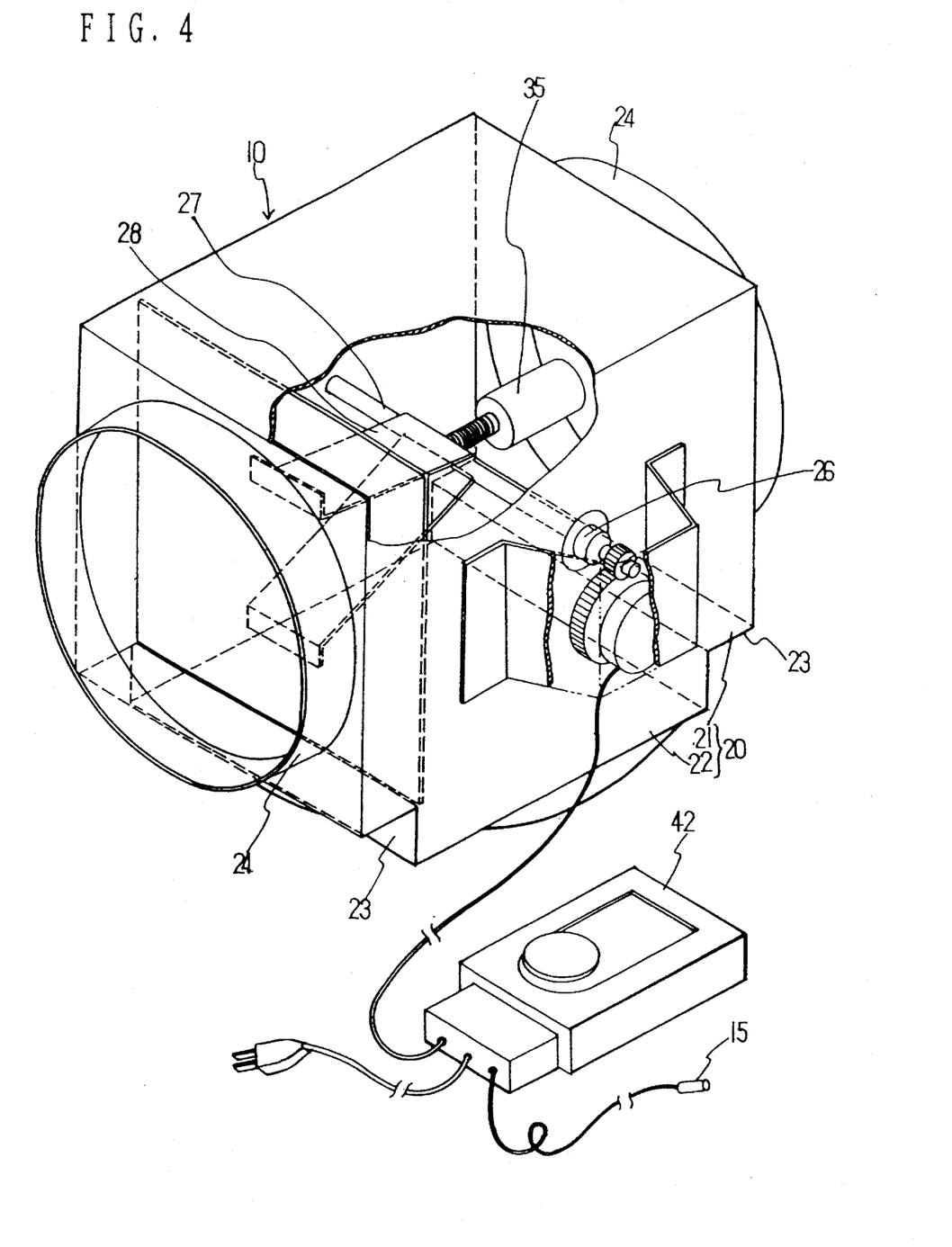
FIG. 4 is a partially cut-off perspective view showing another embodiment of a device of the present invention.
Figure 5:
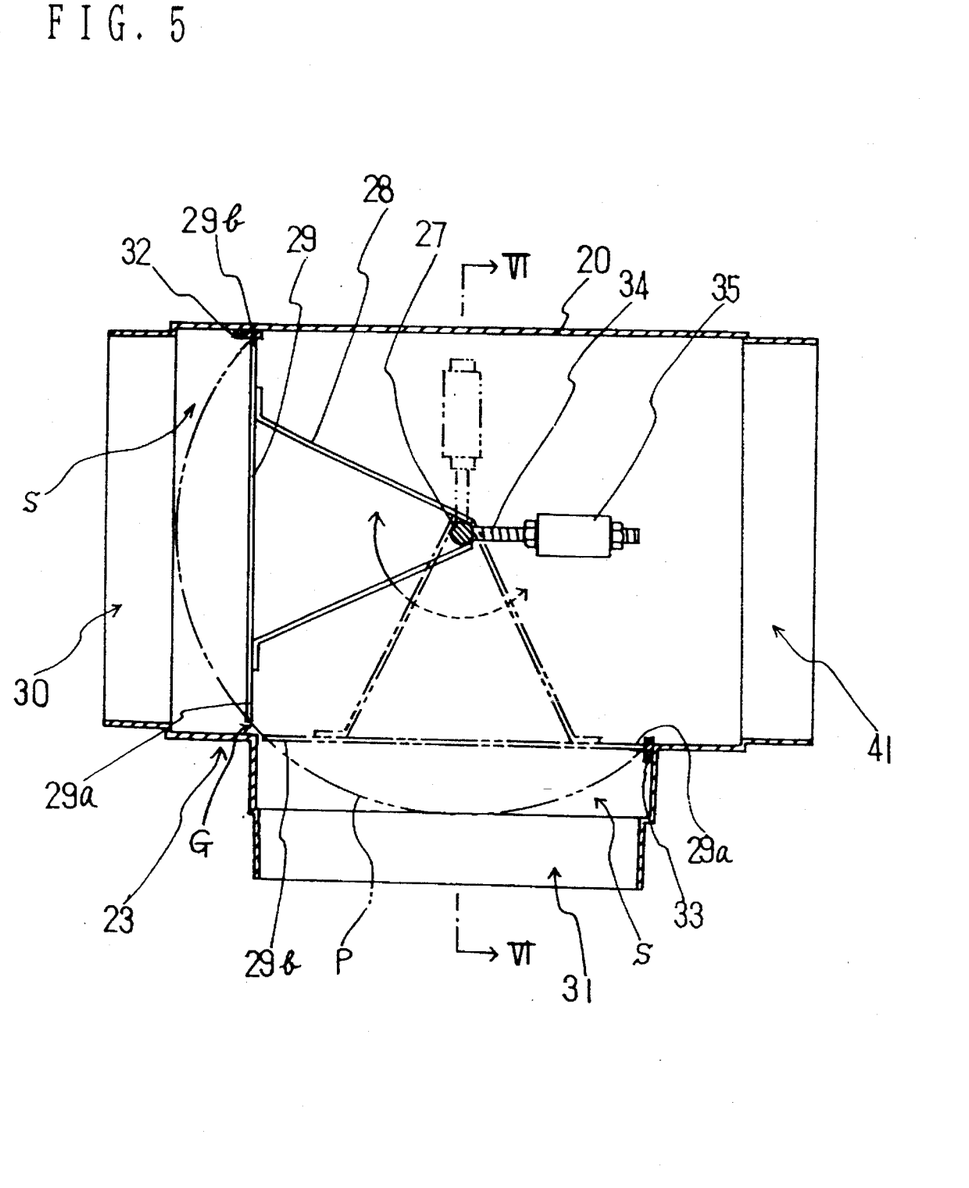
FIG. 5 is a longitudinal sectional view of the device shown in FIG. 4.
Figure 6:
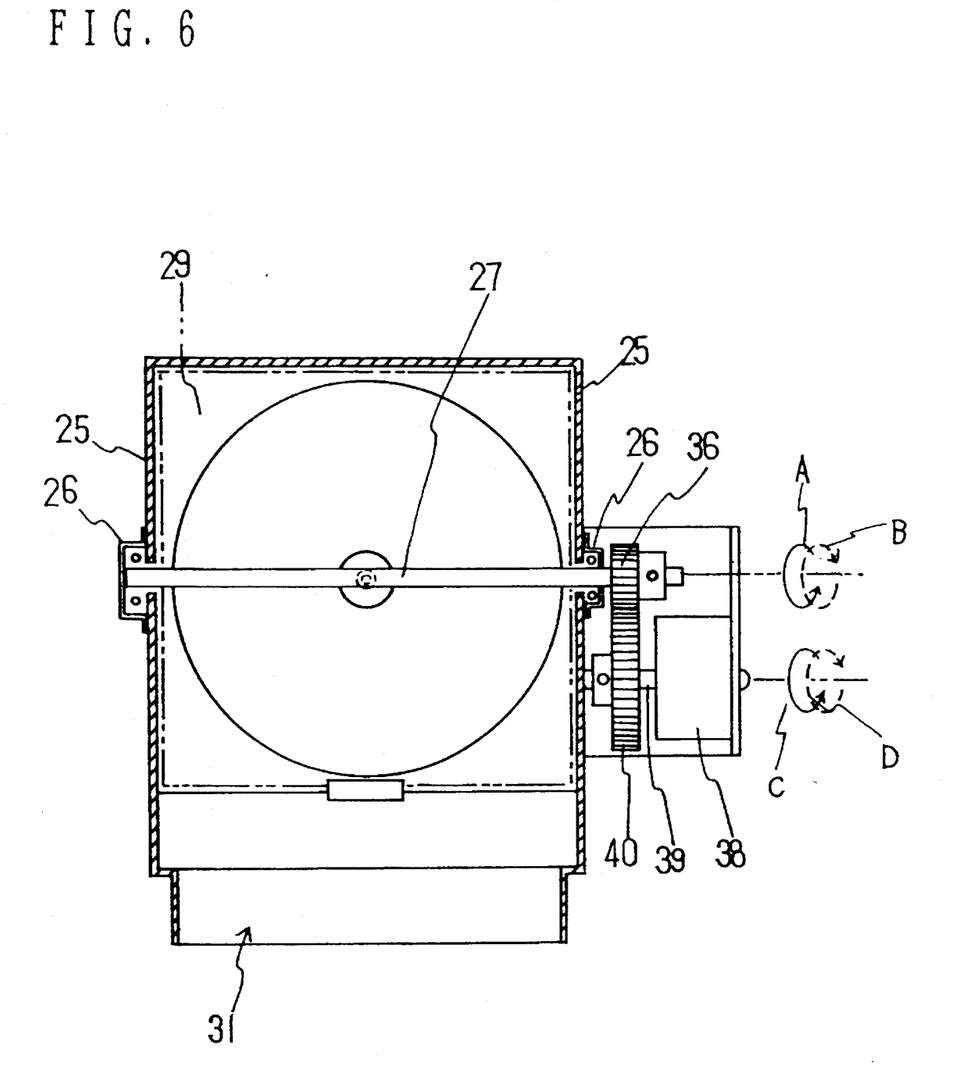
FIG. 6 is a sectional view taken along line VI—VI of FIG. 4.

Hereinafter, referring to FIGS. 4 through 6, another embodiment of the device of the present invention will be explained. The changing device of FIGS. 4 through 6 is substantially the same as the device of FIGS. 1 to 3 except that a rotary shaft 27 for rotating a flap 29 is situated on the center of the casing 20 and the flap 29 is jointed to the rotary shaft 27 by a V-shaped supporting member 28. In this embodiment, the flap 29 rotates around the axis along the shaft 27 such that the front edge of the flap 29 draws an arc P in accordance with reciprocating rotation of the rotary shaft 27 for 90 degrees, as shown in FIG. 5. Therefore, at the first position shown by real lines in FIG. 5, there is a small gap G between the lower edge 29a of the flap 29 and the top of the step portion 23.

Further, at the second position shown by imaginary lines, there is a gap between the upper edge 29b of the flap 29 and the top of the step portion 23. Further, since there is a space S of the step portion in the casing 20, the flap 29 does not hit the casing 20 even if the flap 29 move through the arc P. Numerals 32 and 33 in FIG. 5 are stoppers.

Further, a screw rod 34 is projected from the center of the rotary shaft 27 in the counter direction to the flap 29, and a balance weight 35 is screwed on the screw rod 34. The balance weight 35 is a member for balancing the moment of weight of the flap 29 and the supporting member 28 with respect to the rotary shaft 27. When the flap 29 is sufficiently light, the balance weight member 35 is not necessary. If specific gravity of the fluid is large, a float might be attached on the same side as the flap 29 in place of the balance weight 35.

The above-mentioned changing device can be used for changing various fluid flow passages, for example, of liquid such as oil or water and of various kind of gas such as air. For example, the device can be employed for low pressure oil transfer pipe line, pipe lines for changing water of a water tank or a pond, air changing duct for a kitchen, conditioner for density of specific kind of gas or temperature in a greenhouse or living room, and the like.

Figure 7:
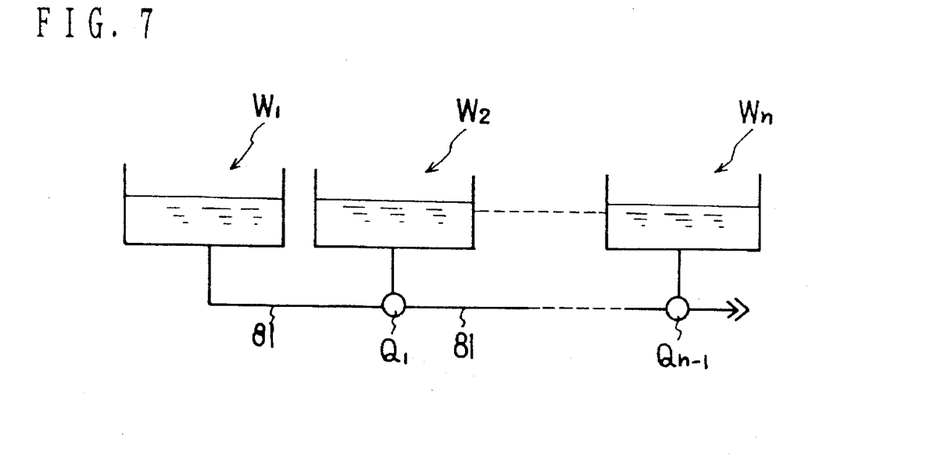
FIGS. 7 to 9 are symbolized fluid circuit diagrams showing embodiments of air control devices of the present invention, respectively.

For example, when hot water is sequentially supplied from plural hot water tanks $W_1$, $W_2$, ... $W_n$ utilizing sun energy, the water supplying pipes 81 are connected through the changing devices $Q_1$, ... $Q_{n-1}$ as shown in FIG. 7. And when the first water tank $W_1$ becomes empty or the water level becomes down to a determined level, this fact is detected by a sensor, and the first changing device $Q_1$ is changed to rotate the flap so that water is supplied from the second water tank $W_2$.

Figure 8:
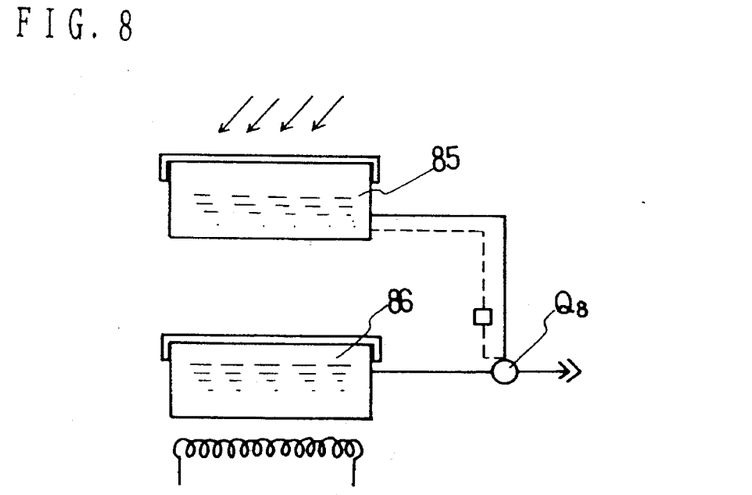
Figure 9:
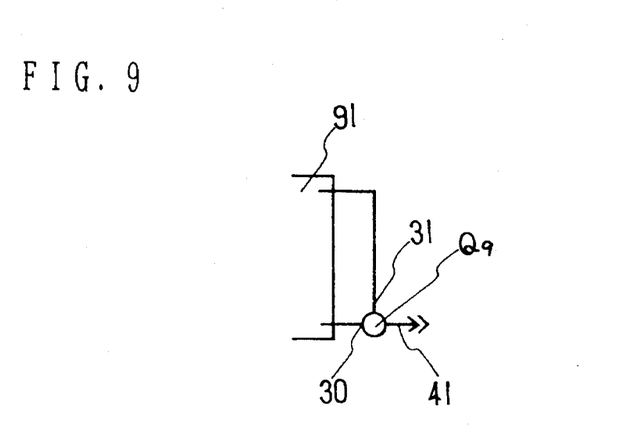

Further, the changing device can be used for a system shown in FIG. 8. In the system of FIG. 8, a water tank 85 utilizing sun energy and an electrically heated water tank 86 are connected through a flow changing device $Q_s$, and when temperature of the water tank 85 utilizing sun energy rises to a predetermined level, the water heated in the water tank 85 is supplied by means of the flow changing device $Q_s$. However, when the temperature of the water tank 85 is not higher than the predetermined level, the hot water in the lower tank 86 is supplied. In the air control system shown in FIG. 9, an upper side and a lower side of a greenhouse 91 are connected with the second opening 31 and the first opening 30 of a flow changing device $Q_9$, respectively, and the third opening 41 is connected to an exhaust fan or $CO_2$-absorbing device. In this system, when the detected $CO_2$ density (or temperature) in the greenhouse 91 rises, the first opening 30 connected to the lower side is opened and the second opening 31 is shut. Then, the air with high $CO_2$ density is exhausted to the outdoors, and fresh air is introduced from the outdoors. In another case, when the $CO_2$ density is low, the second opening 31 connected to the upper side is opened, and the first opening 30 is shut so as to hold the low $CO_2$ density air. In the system, it is effectively utilized that the specific gravity of $CO_2$ is larger than air. The system can also be applied to a temperature control system of a greenhouse, living room or the like. In this case, condition-setting switches in the controller 42 shown in FIG. 1 or FIG. 3 may be preferably set at 18° to 20° C. in a high temperature side (operation temperature when temperature rises) and at 15° to 17° C. in a low temperature side (operation temperature when temperature descends). By the above double standard levels, fluttering of the flap due to the change of temperature can be prevented.

Though the fundamental construction, function and effect are mentioned above, the device of the present invention is not limited to those embodiments, and various additions or changes can be applied as mentioned below, for example.

① In addition to the above sensor 15 for detecting $CO_2$ density or temperature, another functional sensor for detecting smoke, bad smell or poisonous gass is preferable provided at position near the ceiling and/or floor. Such sensor is known as a smell sensor, for example, FOA-8, MD-701, MD-505 available by Komei Rikagaku Kogyo Kabushiki kaisha in Japan. The sensors are to be connected to the controller of the changing device in order to exhaust the bad smell and the like by opening one of the openings corresponding the detected sensor and shutting another opening. In this case, both gases lighter than air, such as smoke, and heavy gas can be smoothly exhausted.

② When the changing device shown in FIGS. 4 to 6 is used in a warehouse or a living room, the changing device is preferably constructed such that the flap 29 can selectively rotate in the third position where the third opening 41 is shut when a second thermal sensor capable of detecting irregular high temperature, for example 120° C., detects the high temperature. In the above-mentioned system, when a fire breaks out, the second thermal sensor detects the high temperature due to fire and the flap 29 shuts the third opening 41 like a fire-preventing-damper. Therefore, another fire preventing damper is not required.

③ The first opening and the second opening may each be made as a cylindrical tube, and the flap might be made as a circular disk plate.

④ Plural changing devices may be set in plural water tanks, greenhouses or living rooms of building so as to be operated in parallel with each other under control of one or more thermal switches or thermal sensors.

Figure 10:
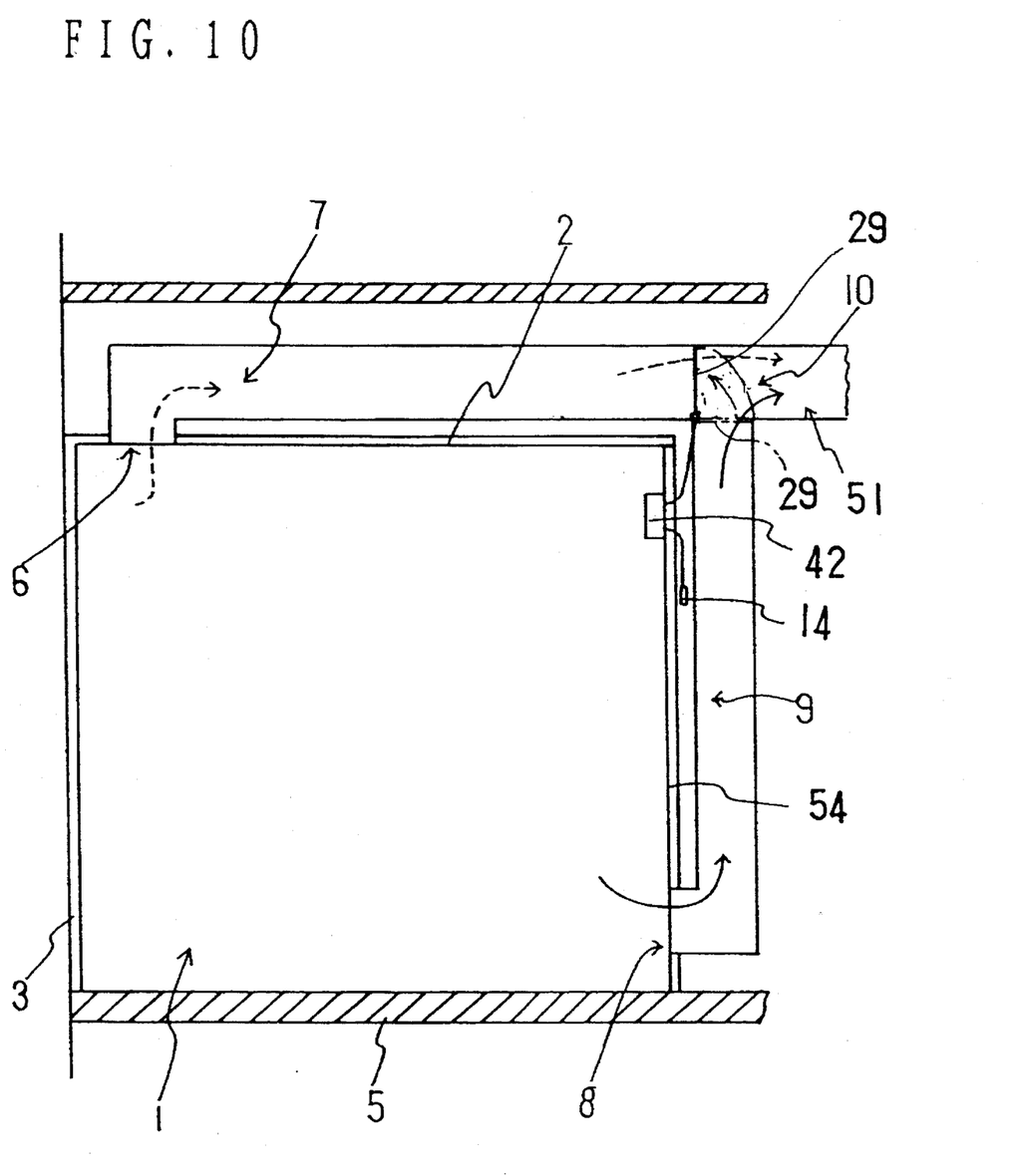
FIG. 10 is a symbolized elevational view of an embodiment of an air control device of the present invention.

In FIG. 10, numeral 1 denotes a room of house or building. The room 1 is enclosed with a ceiling 2, an outer wall 3, an inner wall 4 and a floor 5. Over the ceiling 2, a horizontal duct (the first duct) 7 is extended, and the end of the duct 7 is connected to the inside of the room 1 through an opening 6 formed in the ceiling 2. Further, a vertical duct (the second duct) 9 is extended in the vertical direction at the outside of the inner wall 4, and the lower end of the duct 9 is connected to the inside of room 1 through an opening 8 formed in the lower portion of the wall 4.

The upper end of the vertical duct 9 comes to the horizontal duct 7 so as to form Tee, and the above-mentioned flow changing device 10 is installed at the Tee-cross portion. And an exhaust duct or exhaust passage 51 extends from the third opening of the device 10 in the direction of the extension of the horizontal duct 7. Further, a controller 42 for controlling the operation of the changing device 10 is attached on the inside surface of the inner wall 4. A thermal sensor 15 for detecting the temperature of the outside of the room 1 is attached to the end of a lead wire extending from the controller 42.

As the ducts 7, 9 and 51 and elements of the openings 6 and 8, known conventional ducts and elements for house or building can be employed as they are. If a horizontal duct is already provided over the ceiling, only a vertical duct might be added. The changing device 10 is a device for connecting one of the first duct 7 and the second duct 9 to the exhaust duct 51, and to shut another duct under control of the controller 42. As the changing device 10, conventional devices such as jointed two sets of butterfly valves can be employed. However, the changing device of the present invention of which embodiments are illustrated in FIGS. 1 or 3 can be most suitably employed.

The controller 42 shown in FIG. 10 has relay for driving the rotary actuator or electric motor, a circuit for amplifying the detected signal of the senser, a sequence circuit for driving the relay in accordance with the signals, and switches for setting upper and lower limits of temperature to operate the changing device 10.

Hereinafter, the operation of the system will be explained. The temperature setting switches are set to 18° to 20° C. as the high first temperature and 15° to 17° C. as the low second temperature, for example.

At early morning where external temperature is low, the rotary actuator 38 is rotated in the direction of arrow C in FIG. 3 by virtue of the senser 15 and the controller 42, and therefore, the flap is rotated in the direction of arrow A. Then, the flap 29 is situated in the first position shown by the real lines in FIG. 2, the first opening 30 shuts and the second opening 31 opens. The exhaust opening 41 is always opened. As a result, the horizontal duct 7 in FIG. 10 is shut, and the vertical duct 9 is connected to the exhaust duct 51 which is ventilated by a fan. Therefore, low temperature air in the room is exhausted, and high temperature air is remained in the room.

When the atmosphere temperature rises over the first determined temperature, the rotary actuator 38 is rotated in the direction of arrow D by virtue of the senser 15 and controller 42, and the flap 29 is rotated in the direction of arrow B to situate at the second position shown by the imaginary lines of FIG. 2. Then, the socond opening 31, i.e., the vertical duct 9 is shut and the first opening, i.e., the horizontal duct 7, is opened. Therfore high temperature air in the room is exhausted and the low temperature air is held.

In the above operation, when temperature rises, the changing operation is not effected at the second temperature and the changing operation is effected when the temperature rises to the first temperature for the first time since the sensor has a non-sensitive area. Therefore, even if temperature of atmosphere repeatedly rises and falls, fluttering of the flap 29 can be advantageously prevented.

As mentioned above, the air control device of the present invention can change the temperature of air exhausted from the room in accordance with the temperature of exterior temperature. Therefore, the device has an energy saving effect for an air conditioning device and room heating devices. Further, the fluid flow changing device of the present invention can change two positions of T-shaped passages by means of one driving source. A balancing weight or float can be attached to the rotary shaft, flap and the like, for obtaining smooth operation.

Though various preferable embodiments are described above with tolerance to the attached drawings, the present invention is not limited to the above embodiments, and various changes and modifications can be made without departing from the scope and spirit of the invention as claimed herein.

What we claim is:

1. A system for controlling an air flow through a room, comprising:

(a) a first passage connected with an inside of the room at a position near a ceiling;

(b) a second passage connected with the inside of the room at a position near a floor;

(c) an exhaust passage connected with an outside of the room;

(d) means for changing the air flow by selectively connecting only a selected one of the first and second passages to the exhaust passage; and (e) means for controlling the air flow changing means, (f) wherein the air flow changing means comprises (f1) a casing having a first opening, a second opening arranged substantially in an L-shaped relationship relative to the first opening with respect to a chamber in the casing, and a third opening for connecting the chamber to the exhaust passage, with the first and second openings respectively connected with the first and second passages, (f2) a flap having a side end rotatably supported at a corner between the first opening and the second opening in the casing, such that the flap can be selectively rotated to a first position for closing the first opening and a second position for closing the second opening, and (f3) means for rotating the flap in accordance with an input from the controlling means.

2. The system according to claim 1, further comprising:

a temperature sensor for sensing an ambient temperature and providing a corresponding input to the controlling means, wherein the controlling means controls the flow changing means so as to connect the first passage to the exhaust passage when the temperature sensor detects that the ambient temperature is higher than a predetermined first temperature, and to connect the second passage to the exhaust passage when the temperature sensor detects that the ambient temperature is lower than a predetermined second temperature which is not higher than the first temperature.

3. The system of claim 2, wherein:

the first and second temperatures are each set to be within a range from 15° to 25° C.

4. The system of claim 1, comprising:

seal members attached to an inside surface of the casing so as to respectively enclose the first opening and the second opening, the seal members being of a ring-like shape such that a periphery of the flap is abutted against a corresponding one of the seal members in the first and second positions of the flap.

5. The system of claim 1, comprising:

a shaft having two ends, situated at the corner of the casing, both ends of the shaft being rotatably supported at side walls of the casing with a first end of the shaft projected through the side wall and connected with the rotating means which is mounted on an outside surface of the side wall, a side of the flap being fixed to the rotatable shaft.

* * * * *